United States Patent [19]
Soderstrom et al.

[11] 3,718,960
[45] March 6, 1973

[54] MACHINE FOR MANUFACTURING HELICAL FIN TUBES

[76] Inventors: Sten Hilding Soderstrom, Ulvsatersvagen 9; Olof Cardell, Strandvagen 1, both of Sollentuna, Sweden

[22] Filed: Dec. 11, 1970

[21] Appl. No.: 97,245

[52] U.S. Cl........29/157.3 AH, 29/157.3 B, 29/202 D
[51] Int. Cl..........................B23p 15/26, B23p 15/16
[58] Field of Search........29/202 D, 202 R, 157.3 AH, 29/157.3 A, 157.3 B, 33.6

[56] References Cited

UNITED STATES PATENTS

| | | | |
|---|---|---|---|
| 2,400,737 | 5/1946 | Brown | 29/157.3 A |
| 1,322,366 | 11/1919 | Spery | 29/33.6 |
| 3,288,208 | 11/1966 | Wall et al. | 29/157.3 AH |
| 3,482,299 | 12/1969 | Davidson et al. | 29/202 R |

*Primary Examiner*—Charles W. Lanham
*Assistant Examiner*—Donald C. Reiley, III
*Attorney*—Young & Thompson

[57] ABSTRACT

A process of manufacturing fin tubes consisting in cutting series of metal plates of desired length from metal strips, feeding said plates in a guide towards the outer periphery of a tube and fastening the plates e.g. by welding by their end edges in a circular or helical row onto the outer surface of the tube, so that the length of the plates corresponds to the height of the fin formed of the plates, thus permitting the adjustment of the height of the fin solely by cutting metal plates of different length from one single strip or strips of the same width. A machine for performing the process consists of a device for feeding loose metal plates cut from a strip of determined width in a row into a gutter-like guide, means for moving said plates along said guide in desired spacing relation towards the outer periphery of a tube, means for rotating said tube and possibly also for longitudinal displacement thereof relative to said gutter-like and means for welding said metal plates with their end edges onto the tube in a row to form a fin thereon.

10 Claims, 9 Drawing Figures

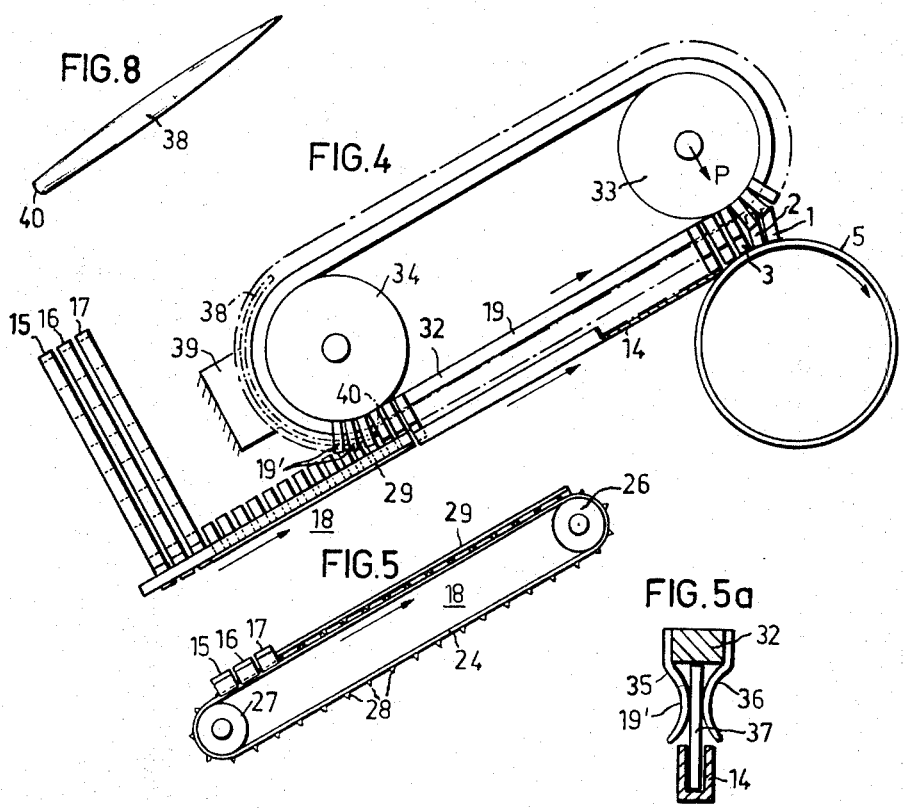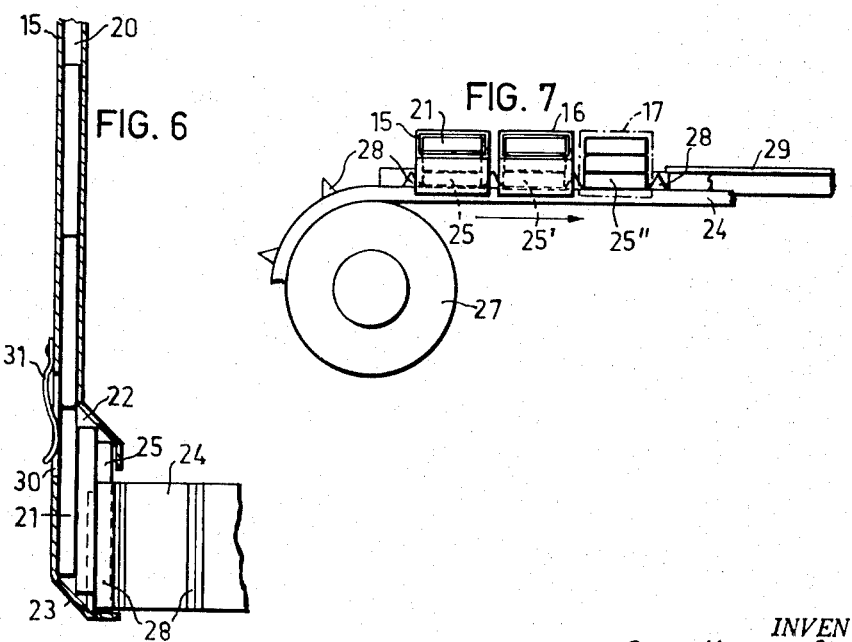

MACHINE FOR MANUFACTURING HELICAL FIN TUBES

A known process of manufacturing fin tubes consists essentially in winding a metal strip on edge around a tube which is rotated and simultaneously longitudinally displaced if the fin is to extend along a screw line around the outside of the tube. The strip has generally slots in its outer edge, which slots are equidistant and are opened at the outer edge as the strip is wound and fastened on the tube. The fastening is ordinarily performed by welding or soldering. In fin tubes to be used in heat exchangers the height of the fin above the outer surface of the tube must be adapted to the quantity of heat to be transmitted from the inside of the tube to its outside or vice versa. Larger heat quantities necessitate a greater height of the fin, i.e. a larger heat transmitting surface. For this reason the manufacturer of fin tubes must keep metal strips of different width in store (the height of the fin being equal to the width of the strip), to cover the requirements of different buyers. The cutting of slots, where such are required, is also a complicated and costly operation, especially when it is required to cut strips of different width to different depths, which can necessitate the use of a number of different tools. The tool account is therefore also a complication which must be taken into consideration. It is also often required to cut slots of different width and the broader the slots are, the larger is the amount of reject material in connection with the manufacture of the slotted strip.

The purpose of the invention is to eliminate the above drawbacks and first of all to reduce the number of different dimensions of strips to be kept in store, in the optimal case even to permit the use of strips of one single width as a raw material for the different tubes. A further purpose of the invention is to simplify the cutting of the slots and to reduce or even entirely eliminate reject material in the manufacture of the fins.

The term "metal plate" is used in the following, but it is understood that the invention also covers the cases where the fin elements are cut from wires, which can be of circular, oval or polygonal cross section.

The invention is mainly concerned with a process of manufacturing fin tubes with helical or annular fins interrupted by slot-like, e.g. V-shaped openings at least at their outer edges. The main characterizing feature of the invention is that preferably square or rectangular metal plates are cut from a strip of determined width by transverse cuts, the length of the cut-off pieces being made equal to the height of the fin to be formed by the strip elements, and that the fin is composed of these metal plates, which are fixed onto the tube one after the other either tightly adjacent to each other or spaced from each other around the outside of the tube in such a manner, that the spaces or intervals between the metal plates form said slots or openings.

It is thereby possible according to the purpose of the invention to use strips of only one width as initial material for the fins. When fins of different height are wanted, it is possible to cut from a single strip or from several strips of identical width pieces of a length corresponding to the desired height of the fin and to weld the strip pieces by their one end edge onto the outside of the tube one after the other to form the fin. A simple and practical method herefore is to feed the metal plates one after the other along a gutter-like guide leading to the outside of the tube and to weld the plates onto the latter while the tube is rotated about its longitudinal axis and possibly also displaced longitudinally in the direction of said axis relative to the guide. The guide can be arranged in such a manner, that the metal plates are fed in a radial position relative to the tube, but it might also be possible to give the guide an inclination relative to the radius of the tube so that the metal pieces will form angles with said radius, i.e. be more or less inclined relative to the generatrix of the outer surface of the tube.

Though it often might be easier to displace the tube longitudinally during the feeding and welding of the metal plates onto the tube, it is also possible instead to rotate the tube without displacing it and to displace the gutter-like guide along the tube while the latter is rotated. If necessary, both the guide and the tube can be displaced relative to each other.

It can often be sufficient, especially if the tube has a large outer diameter, to cut the metal plates from the strip along a transverse straight line, but it is also possible, especially for tubes of small diameter, to effect the cutting of the strip to pieces by stamping or the like in such a manner that the end edges of the metal plates receive an arcuate form with a bent radius at least approximately corresponding to the outer radius of the tube.

If the welding is performed by adding material, an important advantage is obtained by the fact that a welding ridge is formed which extends along an annular or helical line around the tube and which extends across the spaces between the welded-on plates. A heat transfer medium flowing along the outside of the tube will thereby receive a turbulent flow. The laminar flow, which otherwise would occur on a smooth tube surface, will in other words be disturbed by the ridges and the heat transmission to or from the medium will be improved.

The invention also comprises fin tubes manufactured according to the method described.

A machine for performing said method is, according to the invention, characterized in that it comprises a gutter-like guide for feeding loose metal plates to the outside of a tube, a device for feeding the metal plates along said guide and a welding device for fixing them onto the outside of the tube. The device for feeding the metal plates into the guide can advantageously consist of a feed stoker, an extracting conveyor for removing the metal plates from the stoker and feeding them in a row to the gutter-like guide and an endless belt with slips arranged to grip the metal plates and to feed them along the gutter-like guide to a welding station on the outside of the tube. Such a machine can be made to work entirely automatically. In order to permit the feeding and welding of a large number of metal plates per time unit the stoker can have several outlets for the metal plates. It can be formed with several upright channels, provided at their lower end with side openings turned towards an extracting conveyor which in its turn on its side turned towards the side openings has a number of projections equally spaced from each other by a distance corresponding to the width of the metal plates. When the extracting conveyor is operating a metal plate will be caught between each pair of consecutive projections when such a projection moves past an opening.

Further characteristic features of the invention and advantages in connection therewith, will be set forth in the following description of an embodiment of the invention illustrated in the accompanying drawings.

FIG. 4 shows diagrammatically a machine for fixing metal pieces onto the outside of a tube in an elevational view.

FIG. 5 shows a horizontal projection of a feed conveyor included in the machine illustrated in FIG. 4.

FIG. 5a shows a cross section of a feed conveyor with clips for the metal plates to be forwarded.

FIG. 6 shows a vertical section through a stoker for the metal plates and the adjoining part of an extracting conveyor.

FIG. 7 shows a horizontal projection of the stoker and the said extracting conveyor. FIGS. 5a, 6 and 7 are executed at a larger scale than FIGS. 4 and 5.

FIG. 8 shows a development in a plane of an opening wedge for the clips.

Figure 1:
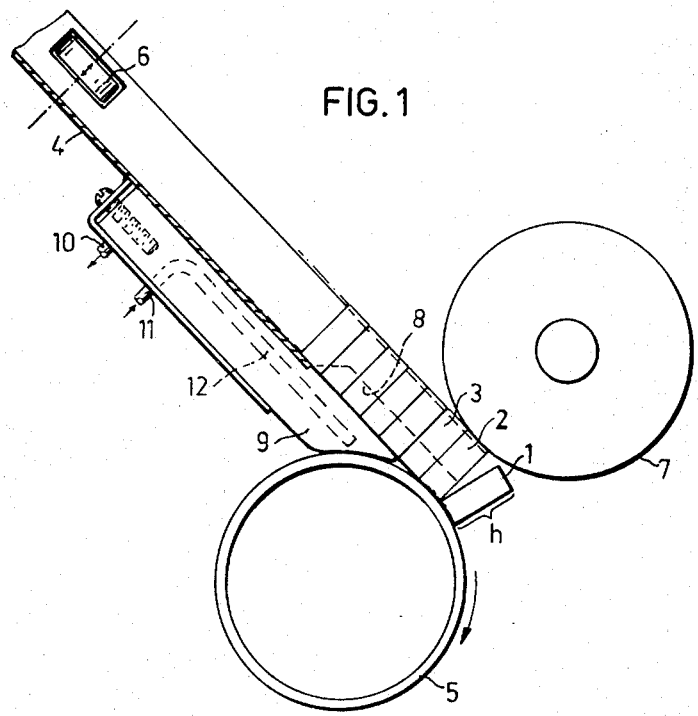
FIG. 1 shows a tube in the process of forming a fin thereon in a device shown in side elevation.

As illustrated in FIG. 1 the metal plates 1, 2, 3, which are preferably rectangular or have arcuate end edges, are fed in a row along a gutter-like guide 4 towards the outside of a tube 5 on which a fin is to be formed. The gutter-like guide maintains the metal pieces in a plane forming preferably right angles but possibly also other angles with the axis of rotation of the tube. The feeding of the metal plates can be obtained e.g. because of the inclination of the gutter-like guide and/or with the assistance of a feeding mechanism marked in FIG. 6 by a pair of feed rollers 6, extending through openings in opposite sides of the gutter-like guide to engage these and feed them along the guide, the metal plates being thereby kept in alignment with their longitudinal edges either adjacent to each other or spaced from each other. A roller 7 placed near the end of the gutter-like guide adjacent to the tube 5 and opposite the tube is arranged to press the metal plates with their ends turned towards the tube onto the outer surface of the tube. Near said end of the guide there is a side opening 8 therein, through which welding electrodes can be inserted in order to permit the welding of the metal plates pressed onto the outside of the tube by the roller 7 by their inner end edges onto the tube 5. If the tube only rotates and the gutter-like guide does not move, an annular fin is formed around the outside of the tube, as the metal plates are welded, while V-shaped slot-like openings are formed between the adjacent longitudinal edges of the plates. If the tube and the gutter-like guide are displaced relative to each other in the longitudinal direction of the tube while the latter is rotated, a helical fin is formed on the outside of the tube. At the underside of the gutter-like guide there may be a cooling sleeve 8 with an inlet 10 for the cooling fluid, e.g. water, and an outlet 11 for a cooling fluid tube 12, the inner opening of which is located near the portion of the cooling sleeve situated adjacent to the tube.

Figure 2:
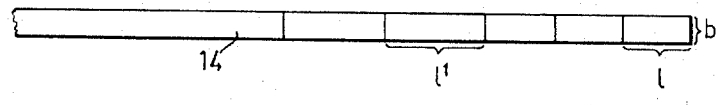
FIG. 2 shows a strip of fin material in a plane view.

A special advantage concerning the storing and the economy of fin material is obtained if the metal plates 1, 2, 3, which are to form the fins, are cut from a strip 13, FIG. 2, which has the same width $b$ as the metal plates and the length of which is equal to the height $h$ of the fin. When fin tubes with another height of the fin are to be manufactured, metal plates are cut from the same strip or from a strip of the same width $b$ as before, but with another length $l^1$. In the most advantageous case it is therefore sufficient to use metal strips of one single width as raw material for the fin. Instead of strips it is also possible to use wire of desired cross section, e.g. circular, oval or polygonal.

Figure 3:
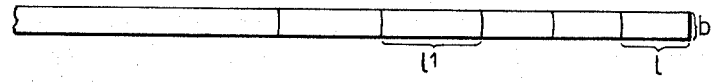
FIG. 3 shows another strip of fin material in the same manner as in FIG. 2.

The cutting of the strip can be effected by stamping along transverse straight lines, as shown in FIG. 2, or along transverse, curved lines, as shown in FIG. 3, the curved end edges of the metal plates formed thereby being able to adapt themselves better to the periphery of the tube. Preferably the end edges of the strip elements are given the same radius of curvature as the outer surface of the tube.

With present techniques of welding the metal plates can be welded onto the outside of the tube at a considerable speed, e.g. four to six plates per second. This necessitates a quick acting feed mechanism. It is further necessary to be able to change the space between consecutive metal plates on the outside of the tube so as to meet different requirements of heat transmission. The feed mechanism must thus be able to maintain the metal plates in exact positions relative to each other. A feed mechanism complying with said requirements is illustrated in FIGS. 4 to 8.

This feed mechanism comprises, besides the gutter-like guide here marked 14 for feeding separate metal plates to the outer periphery of the tube 5, a device for delivering the metal plates to the guide and a welding unit (not illustrated) for their fastening onto the outer periphery of the tube. The metal plates nearest the tube are marked 1, 2 and 3 respectively, as in the embodiment previously described. The delivering device consists of a stoker here composed of three parts 15, 16, 17; an extracting conveyor 18 for extracting the metal plates from the stoker and transferring them in a row to the gutter-like guide 14 and an endless belt 19 with clips 19' arranged to grip the metal plates and feed them along the gutter-like guide 14 to the welding station at the outside of the tube.

Each stoker portion 15, 16, 17 forms an upright, possibly inclined channel 20 (FIG. 6) for a row of metal plates 21 standing on each other, said channel 20 having at its lower end a side opening 22 and an inclined bottom wall 23. On this inclined bottom wall 23 the lowest metal plate slides obliquely down and out through the side opening 22, where the outmost plate is retained by an endless belt 24 forming the main portion of the extracting conveyor 18. The outmost metal plate 25, which according to FIG. 6 is adjacent to the belt 24, abuts against it. The belt 24, which runs over a drive roller 26 and a guide roller 27 is on its outside provided with transverse projections 28, the free spaces between consecutive projections being of the same width or approximately the same width as the metal plates, so that a metal plate is caught between the projections of each pair of consecutive projections when such a projection passes the side opening 22 at the lower end of channel 20. Since the welding of the metal plates onto the outer periphery of the tube can be executed at such a speed, that up to six metal plates as a rule can be welded in 1 second, the belt 24 must be driven with high velocity. If the lowest metal plate 26 in the channel 20 of the first stoker portion should be missed by a projection 28 on the belt 24, there is the possibility for the lowest plate 25' in the following stoker portion 16 (FIG. 7) to be caught and even if this should be missed, there is still the possibility for the lowest plate 25'' in FIG. 7 in the third stoker portion 17 to be caught between said two projections 28. A guide 29 extends towards the gutter-like guide 14, which guide 29 can consist of a bar of L-shaped cross section having its one leg facing the belt 24 and extending parallel therewith. The other leg extends forwards below the stoker. The metal plates will therefore be driven forwards by the belt between this and the leg of the guide parallel therewith.

The stoker portions 15, 16, 17 can at their lower ends on the rear side present an opening 30 (FIG. 6) into which a flat spring 31 extends so as to assist in pressing the lowermost metal plates downwards along the inclined bottom wall 23 and outwards through the side opening 22 in the lower end of the channel 20.

The metal plates are fed along the gutter-like guide 14 while maintaining their order of sequence and their spacing. The clips 19' of the conveyor 19 are mounted on the endless belt 32, which by a driving roller 33 and a guide roller 34 is brought to move with one part parallel with the gutter-like guide 14 above the same. The clips consist (as shown in FIG. 5a) of two opposed curved springs 35, 36 mounted on the belt 32 so that they can grip the metal plates 37 and feed them along the guide 14. In order to permit an easy insertion of the metal plates 37 between the springs 35, 36 of the clips, there is an opening device for bending apart the springs 35, 36 when they approach the metal plates on the guide 29. This device consists of a wedge 38 shown in a position stretched out in a plane in FIG. 8 and extending in its position of use along a curved path concentric with the guide roller 34 at the place at which the belt 32 passes said roller. The wedge 38 is mounted on a support 39 fixedly mounted in the machine. When the belt 32 with its clips passes the wedge 38, the pointed end of which is directed opposite the direction of movement of the clips, the point of the wedge enters between the springs 35, 36 so that these slide apart along the wedge sides. The wedge ends in an abruptly cut off edge at the place where the clips during their movement on the underside of the roller 34 just arrive in a position over the metal plates projecting from the guide 29. These are then gripped one by one and fed along the gutter-like guide 14 towards the tube.

By changing the thickness of the projections 28 it is possible to change the spaces between the metal plates and thereby to change the effective surface of heat transmission of the fins on the tube as well as the conditions of flow around the same.

The metal plates must be pressed onto the tube with a certain force, e.g. by applying a force $p$ on the shaft of roller 33.

The invention is not limited to the described embodiments, which are only to be considered as an example for the application of the invention. It is especially to be noted, that the gutter-like guide 14 in the embodiment according to FIG. 4 can be provided with a cooling device of the kind illustrated in FIG. 1 and so arranged as to leave space for the welding device necessary for fastening the metal plates onto the tube.

What we claim is:

1. A process of manufacturing fin tubes having helical fin means interrupted by slot-like openings at least at the outer edge of the helical fin means, comprising cutting a plurality of metal plates from a metal strip by means of transverse cuts, the length of said metal plates being equal to the height of the fin to be formed and metallurgically bonding one end of each of said metal plates to the tube in a helical series one after the other so that the intervals between the metal plates define said slot-like openings.

2. A process as claimed in claim 1 further comprising feeding said plurality of metal plates one after the other along a gutter-like guide toward the outside of the tube and welding said plates on the tube while rotating the tube about its longitudinal axis and displacing said tube and guide in the direction of said axis relative to each other.

3. A process as claimed in claim 2 further comprising welding with additional material to form a continuous ridge on the outside of the tube even across any intervals between the metal plates welded onto the tube.

4. A process as claimed in claim 1 further comprising executing the cutting of the strip to metal plates by stamping and forming the end edges of the metal plates along a curved line of about the same radius of curvature as the outer periphery of the tube.

5. A process as claimed in claim 1 further comprising maintaining said plates in a line and metallurgically bonding said plates to said tube in the same sequence in which said plates were cut from said strip.

6. A machine for manufacturing fin tubes having helical fins comprising a gutter-like guide for feeding loose metal plates one after the other toward the outside of a tube, means for inserting the metal plates into said guide, means for welding said plates onto the tube, and means to rotate said tube about its longitudinal axis as the plates are supplied.

7. A machine as claimed in claim 6 wherein said inserting means comprises a feed stoker, an extracting conveyor for extracting the metal plates one by one from said stoker and for feeding them in a row to said gutter-like guide, and an endless belt with clips arranged to grip the metal plates and to feed them along the gutter-like guide to the welding station at the outside of the tube.

8. A machine as claimed in claim 6 wherein said inserting means comprises a stoker having a number of upright channels, each having at its lower end a side opening, an extracting conveyor, said openings being turned toward the extracting conveyor and said extracting conveyor comprising an endless belt having projections on the side thereof turned toward the side openings, the projections being arranged in spaced relation at intervals equal to the width of the metal plates so as to permit the belt, when a projection is passing, to catch a metal plate between the projections of a pair of consecutive projections.

9. A machine as claimed in claim 8 wherein each channel is restricted at its lower end by an inclined wall on which the metal plates are arranged to slide down toward the side of the belt under the action of the overlying metal plates.

10. A machine as claimed in claim 6 further including means for displacing said tube and guide in the direction of said axis relative to each other.

* * * * *